(12) United States Patent
Li et al.

(10) Patent No.: US 11,074,437 B2
(45) Date of Patent: Jul. 27, 2021

(54) METHOD, APPARATUS, ELECTRONIC DEVICE AND STORAGE MEDIUM FOR EXPRESSION DRIVING

(71) Applicant: BEIJING BAIDU NETCOM SCIENCE AND TECHNOLOGY CO., LTD., Beijing (CN)

(72) Inventors: Shihu Li, Beijing (CN); Xiangda Yan, Beijing (CN); Yuanzhang Chang, Beijing (CN); Zhibin Hong, Beijing (CN); Tianshu Hu, Beijing (CN); Kun Yao, Beijing (CN); Junyu Han, Beijing (CN); Jingtuo Liu, Beijing (CN); Shengxian Zhu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/930,714

(22) Filed: May 13, 2020

(65) Prior Publication Data

US 2021/0133433 A1 May 6, 2021

(30) Foreign Application Priority Data

Nov. 6, 2019 (CN) .......................... 201911076863.6

(51) Int. Cl.
*G06K 9/00* (2006.01)
*G06K 9/62* (2006.01)

(52) U.S. Cl.
CPC ..... *G06K 9/00308* (2013.01); *G06K 9/00248* (2013.01); *G06K 9/00268* (2013.01); *G06K 9/00288* (2013.01); *G06K 9/6202* (2013.01)

(58) Field of Classification Search
CPC .......... G06K 9/00308; G06K 9/00248; G06K 9/00268; G06K 9/00288; G06K 9/6202; G06K 9/00228; G06K 9/00302; G06F 3/011; G06T 13/40
See application file for complete search history.

(56) References Cited

U.S. PATENT DOCUMENTS

| | | | |
|---|---|---|---|
| 2015/0035825 A1* | 2/2015 | Zhou | G06T 13/40 345/419 |
| 2017/0278302 A1* | 9/2017 | Varanasi | G06T 7/33 |
| 2018/0158230 A1* | 6/2018 | Yan | G06T 11/00 |
| 2018/0300534 A1* | 10/2018 | Elor | G06K 9/00228 |

* cited by examiner

*Primary Examiner* — Phuoc Tran
(74) *Attorney, Agent, or Firm* — Brooks Kushman P.C.

(57) ABSTRACT

A method, an electronic device and a storage medium for expression driving are disclosed. The method may include: performing facial key point detection on a driven character in a first image to obtain a first facial key point sequence; performing the following processing for each second image of a plurality of second images obtained successively: performing facial key point detection on a driving character in the second image to obtain a second facial key point sequence; obtaining a difference between the second facial key point sequence and an expressionless key point sequence which has been determined previously according to an analysis on the second facial key point sequence for a previous second image, and performing expression drive rendering on the driven character based on the difference and the first facial key point sequence. The technical solution may enhance flexibility, interactivity, accuracy etc.

20 Claims, 5 Drawing Sheets

METHOD, APPARATUS, ELECTRONIC DEVICE AND STORAGE MEDIUM FOR EXPRESSION DRIVING

CROSS-REFERENCE TO RELATED APPLICATIONS

The present application claims the priority of Chinese Patent Application No. 2019110768636, filed on Nov. 6, 2019. The disclosure of the above application is incorporated herein by reference in its entirety.

TECHNICAL FIELD

The present disclosure relates to computer technologies, and particularly to a method, an apparatus, an electronic device and a storage medium for expression driving in the field of artificial intelligence.

BACKGROUND

Human facial special effect technique such as makeup, face change, shaping and expression driving may be used in applications such as short video, video live broadcast and film and television special effects.

The existing expression driving is mainly performed by performing mapping drive according to several preset template expressions on pictures including driven characters uploaded by a user, which exhibits undesirable flexibility, interactivity and interest.

SUMMARY

In view of the above, embodiments of the present disclosure propose a method, an apparatus, an electronic device and a storage medium for expression driving.

According to an embodiment, an expression driving method is proposed, and the method may include: performing facial key point detection on a driven character in a first image to obtain a first facial key point sequence; for each second image of a plurality of second images obtained successively, performing the following processing: performing facial key point detection on a driving character in the second image to obtain a second facial key point sequence; in the case that an expressionless frame image has not been determined currently, analyzing the second facial key point sequence, and taking the second facial key point sequence as the expressionless key point sequence in response to determining based on an analysis result that the second image is the expressionless frame image; and in the case that the expressionless frame image has been determined currently, obtaining a difference between the second facial key point sequence and the expressionless key point sequence, and performing expression drive rendering on the driven character based on the difference and the first facial key point sequence.

According to an embodiment, after obtaining the first facial key point sequence, the method may further include: performing an alignment operation on the first facial key point sequence; after taking the second facial key point sequence as the expressionless key point sequence, the method may further include: performing an alignment operation on the expressionless key point sequence; before obtaining the difference between the second facial key point sequence and the expressionless key point sequence, the method may further include: performing an alignment operation on the second facial key point sequence.

According to an embodiment, the method may further include: for the second image currently processed, performing inter-frame smoothing processing on the second facial key point sequence corresponding to the second image currently processed, in conjunction with the second facial key point sequences corresponding respectively to previous N frames of second images adjacent to the second image currently processed, N being a positive integer.

According to an embodiment, performing expression drive rendering on the driven character based on the difference and the first facial key point sequence may include: superimposing the difference on the first facial key point sequence to obtain a rendered key point sequence; performing expression drive rendering on the driven character according to the rendered key point sequence.

According to an embodiment, the method may further include: performing the facial key point detection on the driven character and on the driving character in a same facial key point detection way; each sequences may include: position coordinates corresponding respectively to detected facial key points.

According to an embodiment, obtaining the difference between the second facial key point sequence and the expressionless key point sequence may include: for each position coordinate of the position coordinates in the second facial key point sequence, obtaining a difference between the position coordinate corresponding to a facial key point of the second facial key point sequence and the position coordinate corresponding to a same facial key point in the expressionless key point sequence, to obtain the difference corresponding to the facial key point; superimposing the difference on the first facial key point sequence may include: summing each position coordinate of the position coordinates in the first facial key point sequence with the difference corresponding to the facial key points corresponding to the position coordinate.

According to an embodiment, performing expression drive rendering on the driven character according to the rendered key point sequence comprises: triangulating the driven character according to the position coordinates in the rendered key point sequence, each vertex of vertexes of triangles obtained from the triangulation corresponding to a facial key point; assigning, to each vertex of the vertexes of the triangles, a texture value of the facial key point corresponding to the vertex in the first image; and assigning texture values to points other than the vertexes according to the texture values and/or interpolation manners obtained from the first image.

According to an embodiment, performing expression drive rendering on the driven character based on the difference and the first facial key point sequence may include: performing, by a Graphics Processing Unit, the expression drive rendering on the driven character based on the difference and the first facial key point sequence.

According to an embodiment, the method may further include: in the case that there is a meaningless area in the driven character on which the expression driving has been performed, using an area in the second image corresponding to the meaningless area to fill the meaningless area.

According to an embodiment, an apparatus for expression driving is proposed, the apparatus may include: a first processing module configured to perform facial key point detection on a driven character in a first image to obtain a first facial key point sequence; and a second processing module configured to perform the following processing for each second image of a plurality of second images obtained successively: perform facial key point detection on a driving character in the second image to obtain a second facial key point sequence; in the case that an expressionless frame image has not been determined currently, analyze the second facial key point sequence, and take the second facial key point sequence as the expressionless key point sequence in response to determining based on an analysis result that the second image is the expressionless frame image; and in the case that the expressionless frame image has been determined currently, obtain a difference between the second facial key point sequence and the expressionless key point sequence, and perform expression drive rendering on the driven character based on the difference and the first facial key point sequence.

According to an embodiment, the first processing module is further configured to perform an alignment operation on the first facial key point sequence; the second processing module is further configured to perform an alignment operation on the expressionless key point sequence, and perform an alignment operation on the second facial key point sequence before obtaining the difference between the second facial key point sequence and the expressionless key point sequence.

According to an embodiment, the second processing module is further configured to, for a second image currently processed, perform inter-frame smoothing processing on the second facial key point sequence corresponding to the second image currently processed, in conjunction with the second facial key point sequences corresponding respectively to previous N frames of second images adjacent to the second image currently processed, N being a positive integer.

According to an embodiment, the second processing module superimposes the difference on the first facial key point sequence to obtain a rendered key point sequence, and performs expression drive rendering on the driven character according to the rendered key point sequence.

According to an embodiment, a facial key point detection manner for the driven character is the same as a facial key point detection manner for the driving character; each sequence includes: position coordinates corresponding respectively to detected facial key points.

According to an embodiment, the second processing module obtains, for each position coordinate of the position coordinates in the second facial key point sequence, a difference between the position coordinate corresponding to a facial key point of the second facial key point sequence and the position coordinate corresponding to a same facial key point in the expressionless key point sequence, to obtain the difference corresponding to the facial key point; the second processing module sums, each position coordinate of the position coordinates in the first facial key point sequence with the difference corresponding to the facial key points corresponding to the position coordinate.

According to an embodiment, the second processing module triangulates the driven character according to the position coordinates in the rendered key point sequence, each vertexes of vertexes of triangles obtained from the triangulation corresponding to a facial key point; assigns to each vertex of the vertexes of the triangles, a texture value of the facial key point corresponding to the vertex in the first image; and assigns texture values to points other than the vertexes according to the texture values and/or interpolation manners obtained from the first image.

According to an embodiment, the second processing module performs by a Graphics Processing Unit the expression drive rendering on the driven character based on the difference and the first facial key point sequence.

According to an embodiment, the second processing module is further configured to, in the case that there is a meaningless area in the driven character on which the expression driving has been performed, an area in the second image corresponding to the meaningless area is used to fill the meaningless area.

According to an embodiment, an electronic device is proposed, and the electronic device may include: at least one processor, and a memory communicatively connected with the at least one processor; wherein, the memory stores instructions executable by the at least one processor, and the instructions are executed by the at least one processor to enable the at least one processor to perform the above method.

According to an embodiment, it is proposed a non-transitory computer-readable storage medium storing computer instructions therein, and the computer instructions are used to cause the computer to perform the above method.

The technical solution of embodiments of the present disclosure may have the following advantages or beneficial effects:

Expression driving may be performed at will on the driven character according to respective captured second images of the driving character. As compared to the prior art, the technical solution is no longer limited to several preset template expressions, and thus exhibits better flexibility in the implementation and enhances interactivity and interest and so on. Furthermore, a better accuracy is achieved in the expression driving of the driven character implemented through a series of processing such as facial key point detection, the screening of the expressionless frame image and the obtainment of the difference;

The alignment operation may be performed on the key point sequences obtained, and subsequent processing may be performed based on the aligned sequences, thereby improving the accuracy of the subsequent processing results;

It is possible to perform inter-frame smoothing processing on the facial key point sequence corresponding to the current frame image, in conjunction with the facial key point sequence corresponding to at least one previous frame image, thereby avoiding problems such as jitters and discontinuity that might exist in the key points;

The expression drive rendering may be performed by a Graphics Processing Unit on the driven character according to the obtained facial key point sequence, and thus the processing speed may be improved and real-time processing requirement may be satisfied, e.g., the rendering may be performed on a computer or mobile terminal;

A corresponding area in the image where the driving character lies may be used to fill the meaningless area existing in the driven character on which the expression driving has been performed, so that the whole expression driving looks more real and complete.

Other effects of the above aspects or possible implementations will be described hereunder in conjunction with embodiments.

BRIEF DESCRIPTION OF THE DRAWINGS

The drawings are intended to facilitate the understanding of the technical solutions, not to limit the scope of the present disclosure.

DETAILED DESCRIPTION

Exemplary embodiments are described below with reference to the accompanying drawings. The description includes various details of the embodiments to facilitate the understanding thereof, and should be considered as being merely exemplary. One skilled in the art should recognize that various changes and modifications may be made to the embodiments described herein without departing from the scope and spirit of the application. For the sake of clarity and conciseness, depictions of well-known functions and structures are omitted hereinafter.

In addition, it should be appreciated that the term "and/or" used in the text herein is only an association relationship depicting associated objects and represents that three relations might exist, for example, A and/or B may represents three cases, namely, A exists individually, both A and B coexist, and B exists individually. In addition, the symbol "/" in the text generally indicates that associated objects before and after the symbol are in an "or" relationship.

Figure 1:
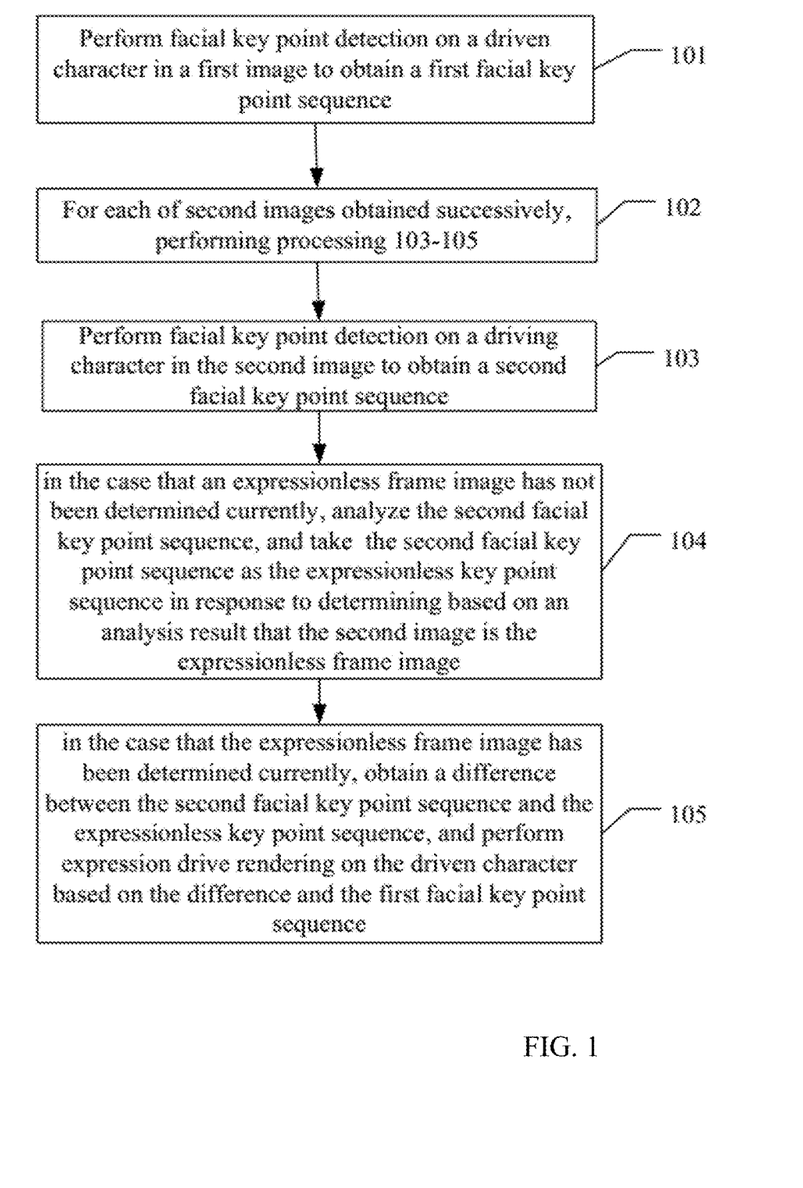
FIG. 1 illustrates a flowchart of a method for expression driving according to an embodiment.

FIG. 1 illustrates a flowchart of a method for expression driving according to an embodiment. With reference to FIG. 1, the method according to the embodiment includes the following operations.

At 101, facial key point detection is performed on a driven character in a first image to obtain a first facial key point sequence.

At 102, second images obtained successively are respectively processed in a manner shown in 103-105.

At 103, facial key point detection is performed on a driving character in the second images to obtain a second facial key point sequence.

At 104, in the case that an expressionless frame image has not been determined currently, the second facial key point sequence is analyzed, and the second facial key point sequence is taken as an expressionless key point sequence if the second image is determined as the expressionless frame image based on an analysis result.

At 105, in the case that an expressionless frame image has been determined currently, a difference between the second facial key point sequence and the expressionless key point sequence is obtained, and expression drive rendering is performed on the driven character based on the obtained difference and the first facial key point sequence.

The facial key point detection may be performed on the first image including the driven character to obtain the first facial key point sequence. The facial key point detection manner and the number of detected facial key points are not limited herein, for example, the facial key point detection may be performed by deep learning which is popular currently.

The first facial key point sequence may be constituted based on position coordinates of the detected facial key points. In other words, the first facial key point sequence may include position coordinates corresponding to the detected facial key points, respectively. After the first facial key point sequence is obtained, an alignment operation may be performed on it. The face of the driven character in the first image might not be a standard face (front face), so the driving character's face may be aligned to the standard face through the alignment operation. How to do the alignment operation pertains to the prior art, for example, analysis, rotational transformation and so on may be performed based on a fixed point such as nose. The number and types of the key points in the first facial key point sequence before and after the alignment operation do not change, but the position coordinates of the key points might change.

In the present embodiment, exemplarily but not restrictively, the second image may refer to an image picked-up/captured with a front camera of a mobile phone in real time, and the captured user is the driving character.

In practical application, each frame of the captured image may be processed as the second image, or some key frames selected according to a predetermined policy may be processed as the second image. An expressionless frame image may be determined firstly from the second images obtained successively.

For example, for the second image currently processed, the facial key point detection may be performed firstly on the driving character therein to obtain the second facial key point sequence, and, the facial detection needs to be performed on the driving character in the same way as the facial detection is performed on the driven character. Likewise, the second facial key point sequence may include position coordinates corresponding to the detected facial key points.

Optionally, if each frame of the captured image is processed as the second image, for the second image currently processed, inter-frame smoothing processing may be performed on the second facial key point sequence corresponding to the second image currently processed, in conjunction with the second facial key point sequence respectively corresponding to previous N frames of second images adjacent to the second image currently processed, N being a positive integer. A value of N may depend on actual needs.

To ensure the video still have continuity after the processing effect is achieved, the key points do not have obtrusive effects such as jitter and discontinuity as much as possible, so the inter-frame smoothing processing may be performed on the obtained second facial key point sequence. A manner/algorithm may employ e.g., Kalman filter algorithm or Laplace smoothing algorithm, which is not limited.

For the second image currently processed, analysis may be performed on the obtained second facial key point sequence, including performing facial posture evaluation, facial expression judgment etc. according to the second facial key point sequence, thereby determining whether the second image currently processed is an expressionless frame image, or, whether the driving character therein has an expression.

If it is determined that the second image currently processed is the expressionless frame image, the obtained second facial key point sequence may be taken as the expressionless key point sequence. Optionally, an alignment operation may be performed on the expressionless key point sequence. If it is determined that the second image currently processed is not the expressionless frame image, the second image may be discarded, and the above processing will be performed on next frame of second image.

If it is determined that the second image currently processed is the expressionless frame image, for each frame of second image obtained later, facial key point detection will be performed on the driving character therein to obtain the second facial key point sequence and obtain a difference between the second facial key point sequence and the expressionless key point sequence, and thereby perform expression drive rendering on the driven character based on the difference obtained and the first facial key point sequence. Optionally, an alignment operation may be performed on the second facial key point sequence before the difference between the second facial key point sequence and the expressionless key point sequence is obtained.

The expression driving may be made irrelevant to rotation of the face through the alignment operation, and thus the accuracy of the subsequent processing result may be improved.

When the expression drive rendering is performed on the driven character based on the difference obtained and the first facial key point sequence, the difference may be superimposed firstly on the first facial key point sequence, thereby obtaining a rendered key point sequence, and then the expression drive rendering may be performed on the driven character according to the rendered key point sequence.

As stated above, each of the sequences in the present embodiment includes position coordinates corresponding respectively to the detected facial key points. Accordingly, obtaining the difference between the second facial key point sequence and the expressionless key point sequence may use the following manner: for each position coordinate of the position coordinates in the second facial key point sequence, obtaining a difference between the position coordinate corresponding to a facial key point of the second facial key point sequence and the position coordinate corresponding to a same facial key point in the expressionless key point sequence, to obtain the difference corresponding to the facial key point. For example, the difference obtained may be superimposed to the first facial key point sequence by summing each coordinate of the position coordinates in the first facial key point sequence with the difference corresponding to the facial key points corresponding to the position coordinate.

For example, 100 facial key points are detected from the face, and numbered as facial key point 1 to facial key point 100, respectively for ease of description. Assuming that position coordinates of facial key point 1 to facial key point 100 are recorded successively in the second facial key point sequence, and the position coordinates of facial key point 1 to facial key point 100 are also recorded successively in the expressionless key point sequence, the difference between the position coordinate of facial key point 1 in the second facial key point sequence and the position coordinate of facial key points 1 in the expressionless key point sequence may be obtained to obtain the difference corresponding to facial key point 1, and so on so forth; assuming that the position coordinates of facial key point 1 to facial key point 100 are also recorded successively in the first facial key point sequence, the position coordinates of facial key point 1 in the first facial key point sequence are summed with the difference corresponding to the facial key point 1, and so on so forth, thereby obtaining the rendered key point sequence.

The expression drive rendering may be performed on the driven character according to the rendered key point sequence. For example, the driven character may be triangulated according to the position coordinates in the rendered key point sequence; each of vertexes of triangles obtained from the triangulation corresponds to a facial key point; for each of the vertexes of the triangles, a texture value of the facial key point corresponding to the vertex in the first image is assigned to the vertex; and for points other than the vertexes, texture values may be assigned to the points according to the texture values and/or interpolation manners obtained from the first image.

The specific type of triangulation algorithm employed is not limited, for example, a Delaunay triangulation algorithm may be employed. Triangles may be obtained through the triangulation, and each of the vertexes of triangles corresponds to a facial key point. For a vertex, a texture value of the position coordinate of a corresponding facial key point in the first image may be assigned to it; and for other points (pixel points) other than the vertexes, if the texture values thereof in the first image can be obtained, the texture values in the first image may be assigned; in addition, the texture values of other points may be obtained by interpolation according to the texture values of respective vertexes.

Optionally, the expression drive rendering may be performed by a Graphics Processing Unit (GPU) on the driven character based on the obtained difference and the first facial key point sequence, and thus the processing speed may be improved, and real-time processing requirement may be satisfied, e.g., the rendering may be performed on a computer or mobile terminal in real time.

In an embodiment, in addition to the obtained facial key points of the driven character in the first image, key points at other positions may also be obtained. The key points optionally cover the entire image. As such, other portions other than the face may be rendered in conjunction with the obtained key points at other positions.

In addition, after expression driving is performed, there might be a meaningless area in the driven character, e.g., the driven character is driven to make a mouth-opening action, and there will be an area without practical significance in the driven character's mouth. Optionally, an area in the second image corresponding to the meaningless area may be used to fill the meaningless area, so that the whole expression driving looks more real and complete.

It may be seen that, according to the above embodiments, expression driving may be performed at will on the driven character according to respective captured second images of the driving character. As compared to the prior art, the technical solution in these embodiments is no longer limited to several preset template expressions, and thus exhibits better flexibility in the implementation and enhances interactivity and interest and so on. Furthermore, a better accuracy is achieved in the expression driving of the driven character implemented through a series of processing such as facial key point detection, the screening of the expressionless frame image and the obtainment of the difference.

Figure 2:
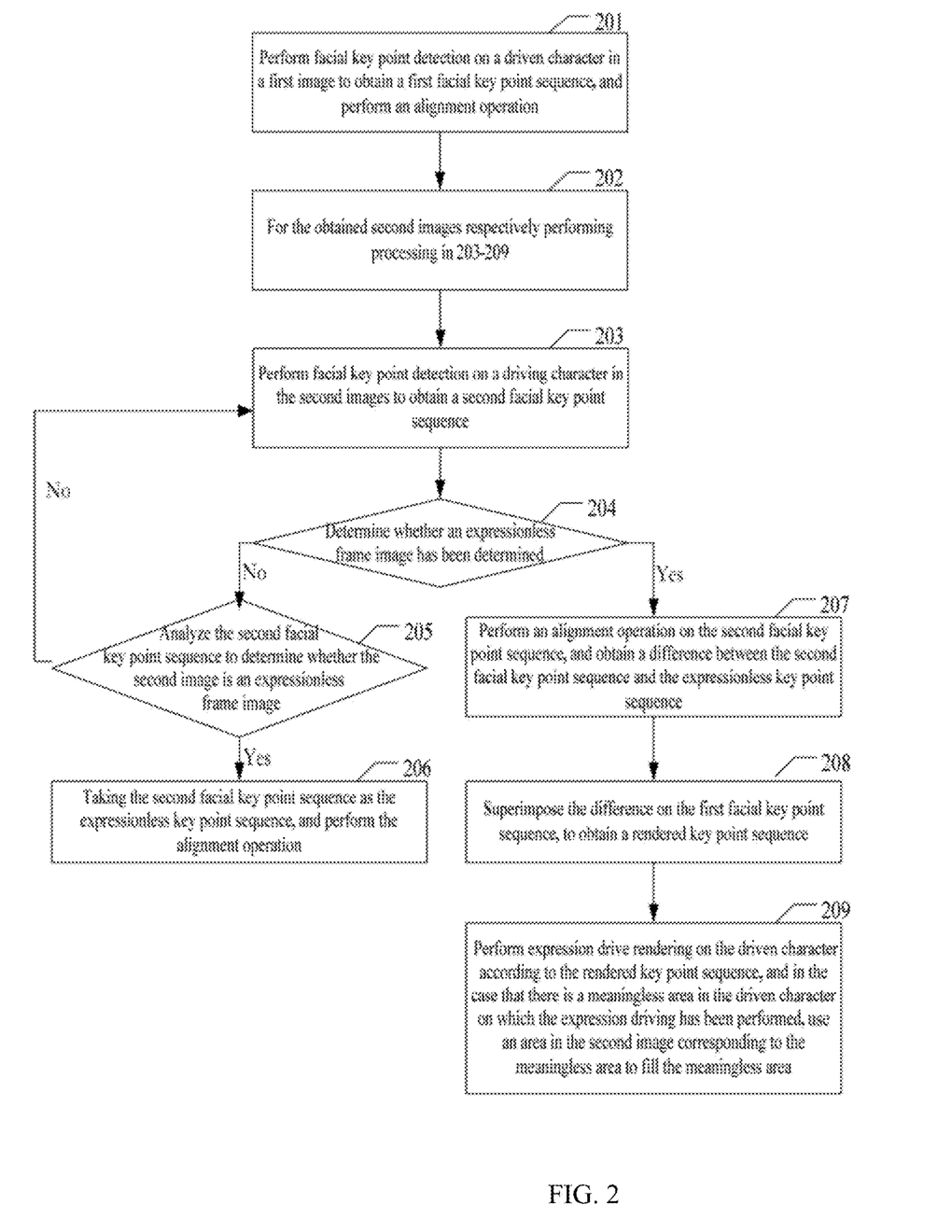
FIG. 2 illustrates a flowchart of a method for expression driving according to an embodiment.

With reference to the above introduction, FIG. 2 illustrates a flowchart of the method for expression driving according to an embodiment. With reference to FIG. 2, the method may include the following operations.

At 201, facial key point detection is performed on a driven character in a first image to obtain a first facial key point sequence, and an alignment operation is performed.

Figure 3:
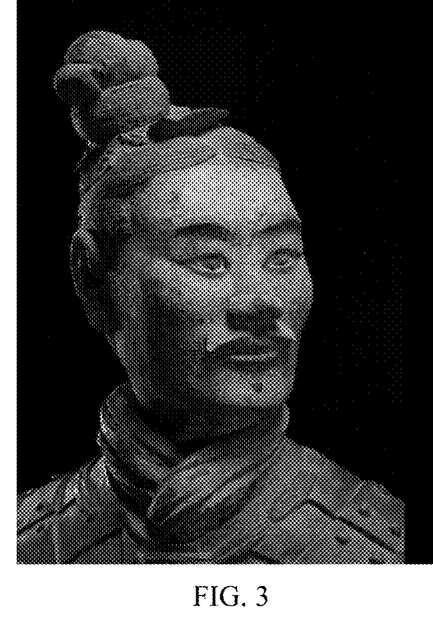
FIG. 3 illustrates a schematic diagram of a first image according to an embodiment.

FIG. 3 illustrates a schematic diagram of the first image according to an embodiment. As shown in FIG. 3, a terracotta warrior is the driven character.

At 202, the second images obtained are respectively processed in a manner shown in 203-209.

Figure 4:
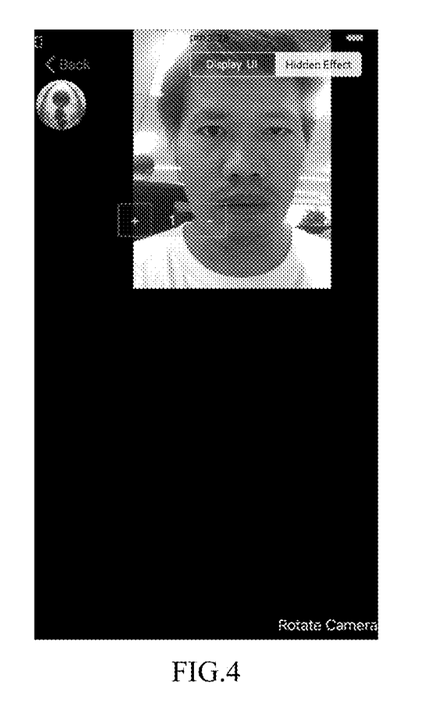
FIG. 4 illustrates a schematic diagram of a second image according to an embodiment.

The second images may be images picked-up/captured with a front camera of a mobile phone in real time, and the captured user is the driving character. FIG. 4 shows a schematic diagram of a second image according to an embodiment.

At 203, facial key point detection is performed on a driving character in the second images to obtain a second facial key point sequence.

In this embodiment, the facial key point detection on the driven character and on the driving character should be performed in a same facial key point detection way.

At 204, determination is made as to whether an expressionless frame image has been determined, and 205 will be performed if no, or 207 will be performed if yes.

At 205, the second facial key point sequence is analyzed to determine whether the second image is an expressionless frame image, and 206 will be performed if yes, otherwise the process beginning with 203 is repeated for next frame of the second image.

At 206, the second facial key point sequence is taken as the expressionless key point sequence, and the alignment operation is performed.

At 207, the alignment operation is performed on the second facial key point sequence, and a difference between the second facial key point sequence and the expressionless key point sequence is obtained.

Each of the sequences stated in this embodiment includes position coordinates corresponding respectively to the detected facial key points.

For each position coordinate of the position coordinates in the second facial key point sequence, obtain a difference between the position coordinate corresponding to a facial key point of the second facial key point sequence and position coordinate corresponding to a same facial key point in the expressionless key point sequence, so as to obtain the difference corresponding to the facial key point.

At 208, the difference obtained is superimposed on the first facial key point sequence, to obtain a rendered key point sequence.

For the position coordinates in the first facial key point sequence, each position coordinate may be summed with the difference corresponding to the facial key point corresponding to the position coordinate.

At 209, expression drive rendering is performed on the driven character according to the rendered key point sequence, and if there is a meaningless area in the driven character on which the expression driving has been performed, an area in the second image corresponding to the meaningless area is used to fill the meaningless area.

For example, the driven character may be triangulated according to the position coordinates in the rendered key point sequence; each of vertexes of triangles obtained from the triangulation correspond to a facial key point; for the vertexes of the triangles, texture values of the facial key points corresponding respectively to the vertexes in the first image are respectively assigned to the vertexes; as for points other than the vertexes, texture values may be assigned to them according to the texture values and/or interpolation manners obtained from the first image.

In addition, the expression drive rendering for the driven character may be performed by a GPU.

Figure 5:
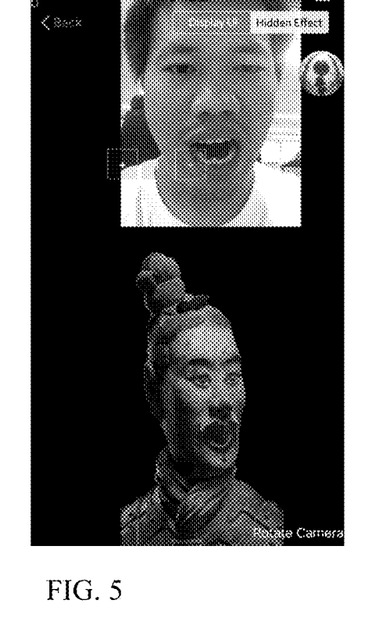
FIG. 5 illustrates a schematic diagram in which a meaningless area is included in a driven character according to an embodiment.
Figure 6:
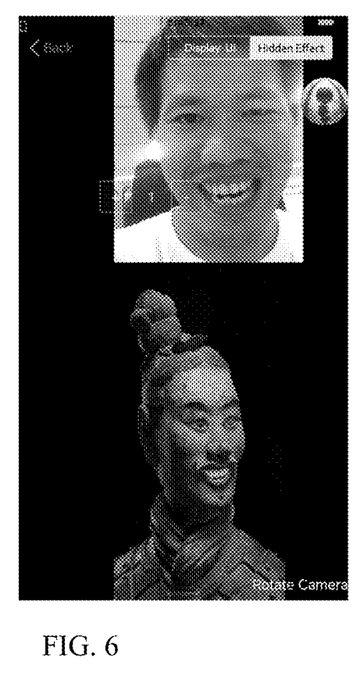
FIG. 6 illustrates a schematic diagram in which the meaningless area is filled according to an embodiment.

FIG. 5 illustrates a schematic diagram in which a meaningless area is included in a driven character according to an embodiment. As shown in FIG. 5, a terracotta warrior is driven to make the mouth-opening action, and there will be an area without practical significance in the terracotta warrior's mouth. This is because the driven terracotta warrior does not have image information such as teeth and tongue in the mouth, and the area will become a meaningless area after the mouth is opened. In this case, a mouth area of the driving character may be used for seamless fusion filling, so that the entire expression driving looks more real and complete. FIG. 6 illustrates a schematic diagram in which the meaningless area is filled according to an embodiment.

It is to be noted that, for ease of description, the aforesaid method embodiments are all described as a combination of a series of actions, but those skilled in the art should appreciate that the present disclosure is not limited to the described order of actions because some steps may be performed in other orders or simultaneously according to the present disclosure. Secondly, those skilled in the art should appreciate the embodiments described in the description are merely exemplary embodiments, and the involved actions and modules are not necessarily required for the present disclosure.

In the above embodiments, different emphasis is placed on different embodiments, and reference may be made to related depictions in other embodiments for portions not detailed in a certain embodiment.

The method embodiments are introduced above. The solutions according to the present disclosure will be further described through an apparatus embodiment.

Figure 7:
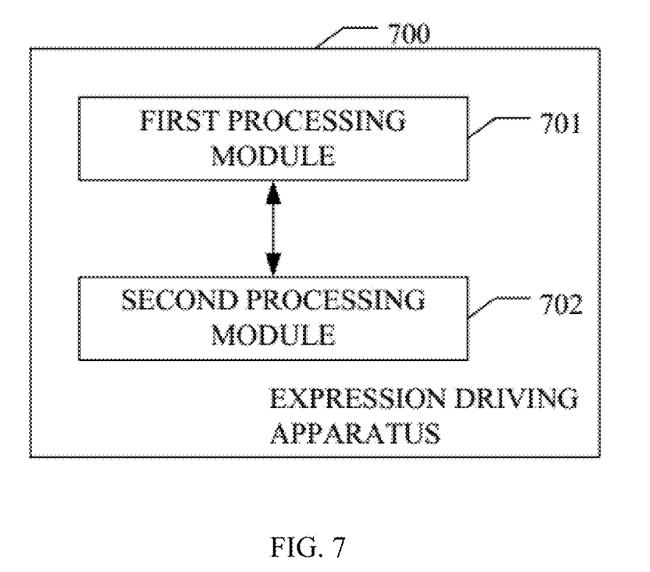
FIG. 7 illustrates a schematic structural diagram of an apparatus 700 for expression driving according to an embodiment.

FIG. 7 illustrates a schematic structural diagram an apparatus 700 for expression driving according to an embodiment. As shown in FIG. 7, the apparatus may include a first processing module 701 and a second processing module 702.

The first processing module 701 is configured to perform facial key point detection on a driven character in a first image to obtain a first facial key point sequence.

The second processing module 702 is configured to perform the following processing respectively for second images obtained successively: perform facial key point detection on a driving character in the second images to obtain a second facial key point sequence; in the case that an expressionless frame image has not been determined currently, analyze the second facial key point sequence, and take the second facial key point sequence as the expressionless key point sequence if the second image is determined as the expressionless frame image based on an analysis result; in the case that the expressionless frame image has been determined currently, obtain a difference between the second facial key point sequence and the expressionless key point sequence, and perform expression drive rendering on the driven character based on the obtained difference and the first facial key point sequence.

The first processing module 701 may perform the facial key point detection on the first image including the driven character to obtain the first facial key point sequence. The facial key point detection manner and the number of detected facial key points are not limited herein, for example, the facial key point detection may be performed by deep learning which is popular currently.

The first facial key point sequence may be constituted based on position coordinates of the detected facial key points. In other words, the first facial key point sequence may include position coordinates corresponding to the detected facial key points, respectively. After the first facial key point sequence is obtained, an alignment operation may be performed on it. The face of the driven character in the first image might not be a standard face (front face), so the driving character's face may be aligned to the standard face through the alignment operation.

In the present embodiment, exemplarily but not restrictively, the second image may refer to an image picked-up/ captured with a front camera of a mobile phone in real time, and the captured user is the driving character.

In practical applications, each captured frame image may be processed as the second image, or some key frames selected according to a predetermined policy may be processed as the second image. The expressionless frame image may be determined firstly from the second images obtained successively.

For example, for the second image currently processed, the second processing module 702 may perform firstly the facial key point detection on the driving character therein to obtain the second facial key point sequence, and, perform the facial detection on the driving character in the same way as performing the facial detection on the driven character. Likewise, the second facial key point sequence may include position coordinates corresponding to the detected facial key points.

Optionally, if each frame of the captured image is processed as the second image, the second processing module 702 may, for the second image currently processed, perform inter-frame smoothing processing for the second facial key point sequence corresponding to the second image currently processed, in conjunction with the second facial key point sequence respectively corresponding to previous N frames of second images adjacent to the second image currently processed, N being a positive integer. A value of N may depend on actual needs.

For the second image currently processed, the second processing module 702 may perform analysis on the obtained second facial key point sequence, including performing facial posture evaluation, facial expression judgment etc. according to the second facial key point sequence, thereby determining whether the second image currently processed is an expressionless frame image.

If it is determined that the second image currently processed is the expressionless frame image, the second processing module 702 may take the obtained second facial key point sequence as the expressionless key point sequence. Optionally, the alignment operation may further performed on the expressionless key point sequence. If it is determined that the second image currently processed is not the expressionless frame image, the second processing module 702 may discard the second image, and perform the above processing for next frame of second image.

If it is determined that the second image currently processed is the expressionless frame image, the second processing module 702 may, for each frame of subsequent second image, perform facial key point detection on the driving character therein to obtain the second facial key point sequence and obtain a difference between the second facial key point sequence and the expressionless key point sequence, and thereby perform expression drive rendering on the driven character based on the difference obtained and the first facial key point sequence. Optionally, an alignment operation may be performed on the second facial key point sequence before the difference between the second facial key point sequence and the expressionless key point sequence is obtained.

When the expression drive rendering is performed on the driven character based on the difference obtained and the first facial key point sequence, the difference obtained may be superimposed firstly on the first facial key point sequence, thereby obtaining a rendered key point sequence, and then the expression drive rendering may be performed on the driven character according to the rendered key point sequence.

As stated above, each of the sequences in the present embodiment includes position coordinates corresponding respectively to the detected facial key points. Accordingly, obtaining the difference between the second facial key point sequence and the expressionless key point sequence may use the following manner: for each position coordinate of the position coordinates in the second facial key point sequence, obtaining a difference between the position coordinate corresponding to a facial key point of the second facial key point sequence and the position coordinate corresponding to a same facial key point in the expressionless key point sequence, to obtain the difference corresponding to the facial key point. For example, the difference obtained may be superimposed to the first facial key point sequence by summing each coordinate of the position coordinates in the first facial key point sequence with the difference corresponding to the facial key points corresponding to the position coordinate.

The second processing module 702 may perform the expression drive rendering on the driven character according to the rendered key point sequence. For example, the driven character may be triangulated according to the position coordinates in the rendered key point sequence; each of vertexes of triangles obtained from the triangulation corresponds to a facial key point; for each of the vertexes of the triangles, a texture value of the facial key point corresponding to the vertex in the first image is assigned to the vertex; for points other than the vertexes, texture values may be assigned to the points according to the texture values and/or interpolation manners obtained from the first image.

The specific type of triangulation algorithm employed is not limited, for example, a Delaunay triangulation algorithm may be employed. Triangles may be obtained through the triangulation, and each of the vertexes of triangles corresponds to a facial key point. For a vertex, a texture value of the position coordinate of a corresponding facial key point in the first image may be assigned to it; and for other points other than the vertexes, if the texture values thereof in the first image can be obtained, the texture values in the first image may be assigned; in addition, the texture values of other points may be obtained by interpolation according to the texture values of respective vertexes.

Optionally, the expression drive rendering may be performed by a Graphics Processing Unit on the driven character based on the obtained difference and the first facial key point sequence.

In addition, after expression driving is performed, there might be a meaningless area in the driven character, e.g., the driven character is driven to make a mouth-opening action, and there will be an area without practical significance in the driven character's mouth. Optionally, the second processing module 702 may use an area in the second image corresponding to the meaningless area to fill the meaningless area.

A specific workflow of the apparatus embodiment shown in FIG. 7 will not be detailed any more here, and reference may be made to corresponding depictions in the above method embodiment.

In summary, by the technical solution of the method and apparatus embodiments, at least the following advantages or beneficial effects may be achieved:

Expression driving may be performed at will on the driven character according to respective captured second images of the driving character. As compared to the prior art, the technical solution is no longer limited to several preset template expressions, and thus exhibits better flexibility in the implementation and enhances interactivity and interest and so on. Furthermore, a better accuracy is achieved in the expression driving of the driven character implemented through a series of processing such as facial key point detection, the screening of the expressionless frame image and the obtainment of the difference;

The alignment operation may be performed on the key point sequences obtained, and subsequent processing may be performed based on the aligned sequences, thereby improving the accuracy of the subsequent processing results;

It is possible to perform inter-frame smoothing processing on the facial key point sequence corresponding to the current frame image, in conjunction with the facial key point sequence corresponding to at least one previous frame image, thereby avoiding problems such as jitters and discontinuity that might exist in the key points;

The expression drive rendering may be performed by a Graphics Processing Unit on the driven character according to the obtained facial key point sequence, and thus the processing speed may be improved and real-time processing requirement may be satisfied, e.g., the rendering may be performed on a computer or mobile terminal;

A corresponding area in the image where the driving character lies may be used to fill the meaningless area in the driven character on which the expression driving has been performed, so that the whole expression driving looks more real and complete;

The expression driving may be applied to application such as short video and video live broadcast, may process the video offline to make film and television special effects, and has broad applicability.

According to some embodiments, an electronic device and a readable storage medium are proposed.

Now reference will be made to FIG. 8, which shows a block diagram of an electronic device for implementing the method according to an embodiment. The electronic device may include various forms of digital computers, such as laptops, desktops, workstations, personal digital assistants, servers, blade servers, mainframes, and other appropriate computers. The electronic device may also include various forms of mobile devices, such as personal digital assistants, cellular telephones, smart phones, wearable devices and other similar computing devices. The components shown here, their connections and relationships, and their functions, are meant to be exemplary only, and are not meant to limit implementations of the inventions described and/or claimed in the text here.

Figure 8:
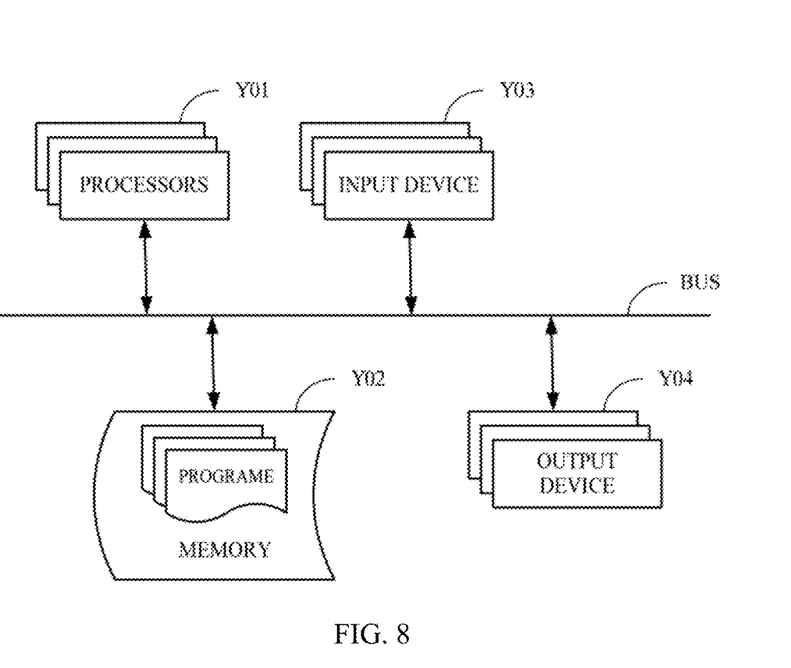
FIG. 8 illustrates a block diagram of an electronic device for implementing the method according to an embodiment.

As shown in FIG. 8, the electronic device includes: one or more processors Y01, a memory Y02, and interfaces connected to components and including a high-speed interface and a low speed interface. Each of the components are interconnected using various busses, and may be mounted on a common motherboard or in other manners as appropriate. The processor may process instructions for execution within the electronic device, including instructions stored in the memory or on the storage device to display graphical information for a GUI on an external input/output device, such as display coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor Y01 is taken as an example in FIG. 8.

The memory Y02 is a non-transitory computer-readable storage medium proposed in an embodiment of the present disclosure. Where, the memory stores instructions executable by at least one processor, so that the at least one processor executes the data query method proposed in an embodiment of the present disclosure. The non-transitory computer-readable storage medium according to an embodiment of the present disclosure stores computer instructions, which may be used to cause a computer to execute the method proposed in an embodiment of the present disclosure.

The memory Y02 is a non-transitory computer-readable storage medium and may be used to store non-transitory software programs, non-transitory computer executable programs and modules, such as program instructions/modules corresponding to the method in the embodiments of the present disclosure (e.g., block 101-105 in FIG. 1 or blocks 201-209 in FIG. 2). The processor Y01 executes various functional applications and data processing of the server, i.e., implements the method stated in the above method embodiments, by running the non-transitory software programs, instructions and modules stored in the memory Y02.

The memory Y02 may include a storage program region and a storage data region, and the storage program region may store an operating system and an application program needed by at least one function; the storage data region may store data created according to the use of the electronic device for implementing the data query method according to the embodiments of the present disclosure. In addition, the memory Y02 may include a high-speed random access memory, and may also include a non-transitory memory, such as at least one magnetic disk storage device, a flash memory device, or other non-transitory solid-state storage device. In some embodiments, the memory Y02 may optionally include a memory remotely arranged relative to the processor Y01, and these remote memories may be connected to the electronic device for implementing the data query method according to embodiments of the present disclosure through a network. Examples of the above network include, but are not limited to, an Internet, an intranet, a local area network, a mobile communication network, and combinations thereof.

The electronic device may further include an input device Y03 and an output device Y04. The processor Y01, the memory Y02, the input device Y03 and the output device Y04 may be connected through a bus or in other manners. In FIG. 8, the connection through the bus is taken as an example.

The input device Y03 may receive inputted numeric or character information and generate key signal inputs related to user settings and function control of the electronic device for the data query method, and may be an input device such as a touch screen, keypad, mouse, trackpad, touchpad, pointing stick, one or more mouse buttons, trackball and joystick. The output device Y04 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for expression driving, comprising:
performing facial key point detection on a driven character in a first image to obtain a first facial key point sequence;
for each second image of a plurality of second images obtained successively, performing the following processing:
performing facial key point detection on a driving character in the second image to obtain a second facial key point sequence;
in the case that an expressionless frame image has not been determined currently, analyzing the second facial key point sequence, and taking the second facial key point sequence as the expressionless key point sequence in response to determining, based on an analysis result, that the second image is the expressionless frame image; and
in the case that the expressionless frame image has been determined currently, obtaining a difference between the second facial key point sequence and the expressionless key point sequence, and performing expression drive rendering on the driven character based on the difference and the first facial key point sequence.

2. The method according to claim 1, wherein
after obtaining the first facial key point sequence, the method further comprises: performing an alignment operation on the first facial key point sequence;
after taking the second facial key point sequence as the expressionless key point sequence, the method further comprises: performing an alignment operation on the expressionless key point sequence; and
before obtaining the difference between the second facial key point sequence and the expressionless key point sequence, the method further comprises: performing an alignment operation on the second facial key point sequence.

3. The method according to claim 1, further comprising:
for the second image currently processed, performing inter-frame smoothing processing on the second facial key point sequence corresponding to the second image currently processed in conjunction with the second facial key point sequences corresponding respectively to previous N frames of second images adjacent to the second image currently processed, N being a positive integer.

4. The method according to claim 1, wherein performing expression drive rendering on the driven character based on the difference and the first facial key point sequence comprises:
superimposing the difference on the first facial key point sequence to obtain a rendered key point sequence; and
performing expression drive rendering on the driven character according to the rendered key point sequence.

5. The method according to claim 4, further comprising:
performing the facial key point detection on the driven character and on the driving character in a same facial key point detection way;
each sequence comprises: position coordinates corresponding respectively to detected facial key points.

6. The method according to claim 5, wherein obtaining the difference between the second facial key point sequence and the expressionless key point sequence comprises:
for each position coordinate of the position coordinates in the second facial key point sequence, obtaining a difference between the position coordinate corresponding to a facial key point of the second facial key point sequence and the position coordinate corresponding to a same facial key point in the expressionless key point sequence, to obtain the difference corresponding to the facial key point;

superimposing the difference on the first facial key point sequence comprises:

summing each position coordinate of the position coordinates in the first facial key point sequence with the difference corresponding to the facial key points corresponding to the position coordinate.

7. The method according to claim 5, wherein performing expression drive rendering on the driven character according to the rendered key point sequence comprises:

triangulating the driven character according to the position coordinates in the rendered key point sequence, each vertex of vertexes of triangles obtained from the triangulation corresponding to a facial key point;

assigning, to each vertex of the vertexes of the triangles, a texture value of the facial key point corresponding to the vertex in the first image; and assigning texture values to points other than the vertexes according to the texture values and/or interpolation manners obtained from the first image.

8. The method according to claim 1, wherein performing expression drive rendering on the driven character based on the difference and the first facial key point sequence comprises: performing, by a Graphics Processing Unit, the expression drive rendering on the driven character based on the difference and the first facial key point sequence.

9. The method according to claim 1, further comprising:

in the case that there is a meaningless area in the driven character on which the expression driving has been performed, using an area in the second image corresponding to the meaningless area to fill the meaningless area.

10. An electronic device, comprising:

at least one processor; and a memory communicatively connected with the at least one processor; wherein, the memory stores instructions executable by the at least one processor, and the instructions are executed by the at least one processor to enable the at least one processor to perform a method for expression driving, wherein the method comprises:

performing facial key point detection on a driven character in a first image to obtain a first facial key point sequence;

for each second image of a plurality of second images obtained successively, performing the following processing:

performing facial key point detection on a driving character in the second image to obtain a second facial key point sequence;

in the case that an expressionless frame image has not been determined currently, analyzing the second facial key point sequence, and taking the second facial key point sequence as the expressionless key point sequence in response to determining, based on an analysis result, that the second image is the expressionless frame image; and in the case that the expressionless frame image has been determined currently, obtaining a difference between the second facial key point sequence and the expressionless key point sequence, and performing expression drive rendering on the driven character based on the difference and the first facial key point sequence.

11. The electronic device according to claim 10, wherein after obtaining the first facial key point sequence, the method further comprises: performing an alignment operation on the first facial key point sequence;

after taking the second facial key point sequence as the expressionless key point sequence, the method further comprises: performing an alignment operation on the expressionless key point sequence;

before obtaining the difference between the second facial key point sequence and the expressionless key point sequence, the method further comprises: performing an alignment operation on the second facial key point sequence.

12. The electronic device according to claim 10, further comprising:

for the second image currently processed, performing inter-frame smoothing processing on the second facial key point sequence corresponding to the second image currently processed in conjunction with the second facial key point sequences corresponding respectively to previous N frames of second images adjacent to the second image currently processed, N being a positive integer.

13. The electronic device according to claim 10, wherein performing expression drive rendering on the driven character based on the difference and the first facial key point sequence comprises:

superimposing the difference on the first facial key point sequence to obtain a rendered key point sequence; and performing expression drive rendering on the driven character according to the rendered key point sequence.

14. The electronic device according to claim 13, further comprising:

performing the facial key point detection on the driven character and on the driving character in a same facial key point detection way;

each sequence comprises: position coordinates corresponding respectively to detected facial key points.

15. The electronic device according to claim 14, wherein obtaining the difference between the second facial key point sequence and the expressionless key point sequence comprises:

for each position coordinate of the position coordinates in the second facial key point sequence, obtaining a difference between the position coordinate corresponding to a facial key point of the second facial key point sequence and the position coordinate corresponding to a same facial key point in the expressionless key point sequence, to obtain the difference corresponding to the facial key point;

superimposing the difference on the first facial key point sequence comprises:

summing each position coordinate of the position coordinates in the first facial key point sequence with the difference corresponding to the facial key points corresponding to the position coordinate.

16. The electronic device according to claim 14, wherein performing expression drive rendering on the driven character according to the rendered key point sequence comprises:

triangulating the driven character according to the position coordinates in the rendered key point sequence, each vertex of vertexes of triangles obtained from the triangulation corresponding to a facial key point;

assigning, to each vertex of the vertexes of the triangles, a texture value of the facial key point corresponding to the vertex in the first image; and assigning texture values to points other than the vertexes according to the texture values and/or interpolation manners obtained from the first image.

17. A non-transitory computer-readable storage medium storing computer instructions therein, wherein the computer instructions are used to cause the computer to perform a method for expression driving, wherein the method comprises:

performing facial key point detection on a driven character in a first image to obtain a first facial key point sequence;

for each second image of a plurality of second images obtained successively, performing the following processing:

performing facial key point detection on a driving character in the second image to obtain a second facial key point sequence;

in the case that an expressionless frame image has not been determined currently, analyzing the second facial key point sequence, and taking the second facial key point sequence as the expressionless key point sequence in response to determining, based on an analysis result, that the second image is the expressionless frame image; and in the case that the expressionless frame image has been determined currently, obtaining a difference between the second facial key point sequence and the expressionless key point sequence, and performing expression drive rendering on the driven character based on the difference and the first facial key point sequence.

18. The non-transitory computer-readable storage medium according to claim 17, wherein after obtaining the first facial key point sequence, the method further comprises: performing an alignment operation on the first facial key point sequence;

after taking the second facial key point sequence as the expressionless key point sequence, the method further comprises: performing an alignment operation on the expressionless key point sequence;

before obtaining the difference between the second facial key point sequence and the expressionless key point sequence, the method further comprises: performing an alignment operation on the second facial key point sequence.

19. The non-transitory computer-readable storage medium according to claim 17, further comprising:

for the second image currently processed, performing inter-frame smoothing processing on the second facial key point sequence corresponding to the second image currently processed in conjunction with the second facial key point sequences corresponding respectively to previous N frames of second images adjacent to the second image currently processed, N being a positive integer.

20. The non-transitory computer-readable storage medium according to claim 17, wherein performing expression drive rendering on the driven character based on the difference and the first facial key point sequence comprises:

superimposing the difference on the first facial key point sequence to obtain a rendered key point sequence; and performing expression drive rendering on the driven character according to the rendered key point sequence.

* * * * *